United States Patent [19]

Lechner

[11] 4,320,260

[45] Mar. 16, 1982

[54] CIRCUIT ARRANGEMENT FOR DETERMINING THE CONNECTION CONDITION OF A SUBSCRIBER LINE IN A TELECOMMUNICATIONS NETWORK

[75] Inventor: Robert Lechner, Otterfing, Fed. Rep. of Germany

[73] Assignee: Siemens Aktiengesellschaft, Berlin and Munich, Fed. Rep. of Germany

[21] Appl. No.: 185,446

[22] Filed: Sep. 9, 1980

[30] Foreign Application Priority Data

Sep. 26, 1979 [DE]  Fed. Rep. of Germany ....... 2939009

[51] Int. Cl.$^3$ ........................ H04Q 3/00; H04M 3/22
[52] U.S. Cl. ............................................. 179/18 FA
[58] Field of Search ........... 179/18 F, 18 FA, 18 AD, 179/18 FF, 18 FG, 18 FD, 18 FE, 18 G, 18 GC, 18 H, 16 F, 170 R

[56] References Cited

FOREIGN PATENT DOCUMENTS

| | | |
|---|---|---|
| 11720 | 6/1980 | European Pat. Off. . |
| 1512036 | 4/1969 | Fed. Rep. of Germany . |
| 2009686 | 9/1970 | Fed. Rep. of Germany . |
| 2542615 | 4/1977 | Fed. Rep. of Germany . |
| 1253498 | 11/1969 | United Kingdom . |
| 1481750 | 8/1977 | United Kingdom . |

*Primary Examiner*—Thomas A. Robinson
*Attorney, Agent, or Firm*—Spellman, Joel and Pelton

[57] ABSTRACT

A circuit arrangement for determining the connection condition of a plurality of subscriber lines in a telecommunication network, each of the subscriber lines having two wires extending between a subscriber station and a subscriber line interface circuit and being connected via respective resistors to the two poles of a DC voltage source. For a group of such subscriber lines the operating conditions are consecutively monitored by sampling the voltage occurring at two sampling points of both wires by a respective multiplexor and passing it to a comparator having inputs which are temporarily interconnected by filter capacitors each separately associated with a respective subscriber line interface circuit. In addition, the comparator receives a reference voltage determining a threshold voltage. For ground key indication one of the sampling points is connected to one input of a further comparator which second input is supplied by a corresponding further reference voltage. The output signals of both comparators are presented at a central control unit for evaluation. When monitoring a ground key indication the output signal of the second comparator, however, is passed only if presupposed signals indicating correct operation, i.e. closed loop condition are present.

12 Claims, 1 Drawing Figure

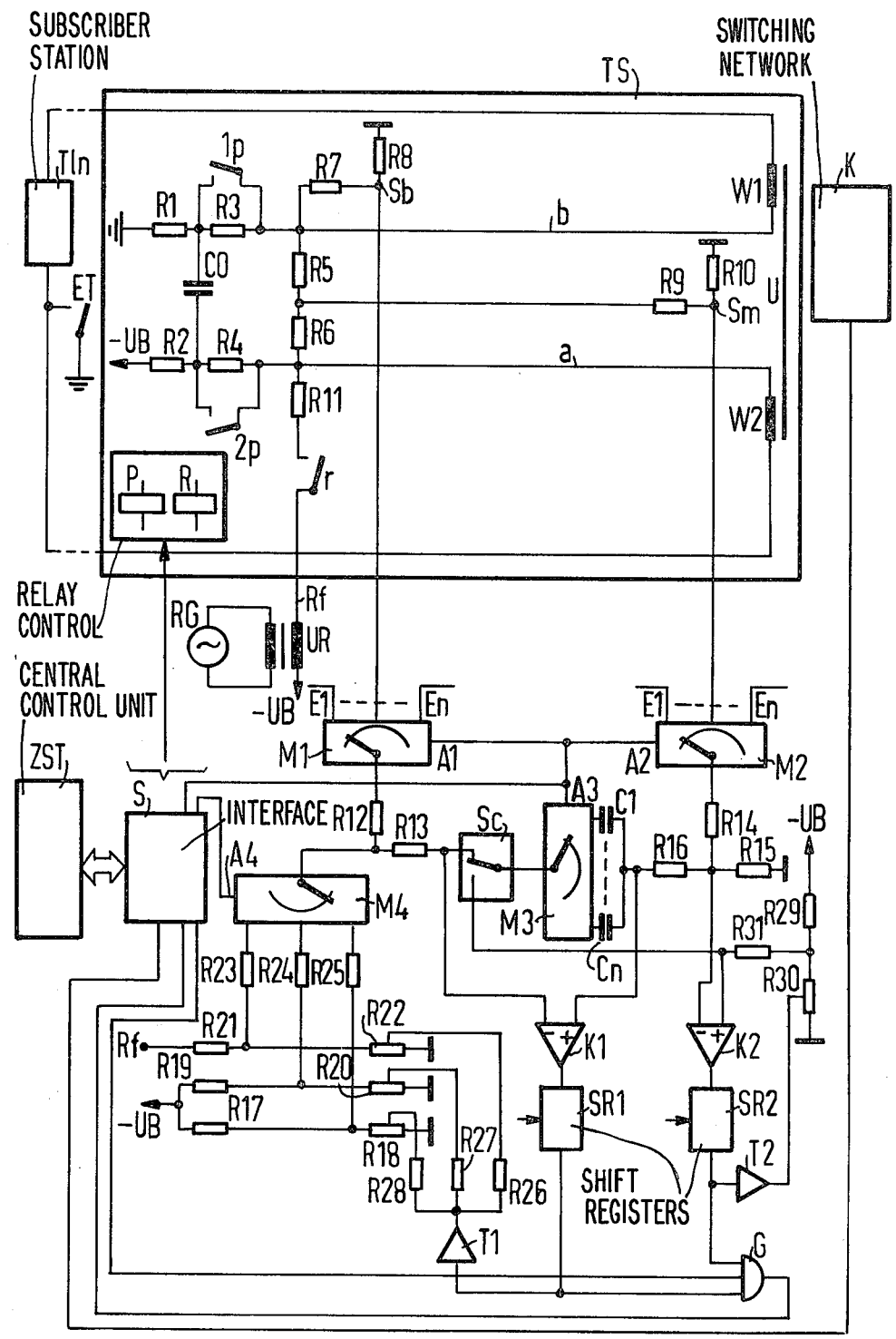

CIRCUIT ARRANGEMENT FOR DETERMINING THE CONNECTION CONDITION OF A SUBSCRIBER LINE IN A TELECOMMUNICATIONS NETWORK

BACKGROUND OF THE INVENTION

The present invention relates to a circuit arrangement for determining the connection condition of a subscriber line in a telecommunications network. The subscriber line comprises two wires which extend between a subscriber station, such as a telephone, and a subscriber line interface circuit which may, for example, form part of a private branch exchange. The two wires of the subscriber line are connected in the subscriber line interface circuit via respective resistors to the two poles of a DC voltage source. The connection condition of the subscriber line (e.g., on-hook, off-hook and ground key actuation) is determined by evaluating the potentials which exist at sampling points within the subscriber line interface circuit. The determination is made, from among the various possible connection conditions of the subscriber line, in dependence upon the operating condition of the subscriber line interface circuit.

In telephone exchanges, a subscriber line interface circuit is required at the point of connection between the subscriber line and the exchange. This subscriber line interface circuit performs a number of functions. It serves, inter alia to transmit the speech signal in both directions, to supply the calling signal to the line and to form a terminal impedance for the line. In addition, the subscriber line interface circuit contains a two-to-four wire hybrid for transforming the two wire system of the subscriber line into the four wire system within the exchange. In exchanges which contain an electronc switching matrix, the subscriber line interface circuit contains a device for supplying a DC voltage to the telephone subscriber station. This voltage supply device comprises supply resistors over which each wire of the subscriber line is connected with the supply source. In this way, the changes in potential which occur as a result of changes in the connection conditions of the line may be used in the determination of these connection conditions (open loop, closed loop and ground key actuation). An evaluating circuit coupled to the corresponding wires of the subscriber line is therefore able to recognize a request for a line connection initiated at the subscriber station or a ground key actuation at the subscriber station signalling a command to initiate a callback or transfer procedure. When the handset at the subscriber station is taken off-hook and closes the subscriber line loop, it must be determined whether a subscriber station is being called, and the dialing pulses from the calling station must be evaluated. With this particular evaluation, it is necessary to provide a sufficient margin of safety against erroneous operation. This is made difficult by the fact that a certain leakage current can flow even in the open-loop (on-hook) condition of the line. In addition, interference can occur due to AC voltage components which are induced in the line. The evaluation circuit must be designed so that it can determine the connection condition of a subscriber line independently of such outside influences.

If the DC voltage supply device for the two subscriber line wires is not exactly symmetrical in construction, the equalizing currents which result from this lack of symmetry can also have an interfering effect.

In addition to the requirement of a sufficient margin of safety in the determination of the connection condition, it is necessary, particularly with electronic exchanges, to minimize the cost of the functional units coupled with the individual subscriber line interface circuits. In this way, it is possible to combine a large number of such units within a single sub-component of the exchange.

SUMMARY OF THE INVENTION

It is an object of the present invention to provide a circuit arrangement for determining the connection condition of a subscriber line interface circuit which solves the above-noted problems in a optimal manner in view of the use of electronic system components.

This object, as well as other objects which will become apparent in the discussion that follows, are achieved, according to the present invention, by providing a first comparator having first and second inputs and an output which produces a first output signal indicating the presence of a first group of operating conditions in the monitored subscriber line interface circuits and a second comparator having first and second inputs in an output for producing a second output signal indicating the presence of a second group of operating conditions in the monitored subscriber line interface circuits. The two comparators receive voltages from two sampling points in each subscriber line interface circuit. These sampling points are successively monitored by two selector units, one scanning all the first sampling points and the other scanning all of the second sampling points in the subscriber line interface circuits. At least one input of both the first and second comparators is coupled to the outputs of the two selector units. A central control unit is provided for selecting certain operating conditions in each subscriber line interface circuit and a DC voltage source provides a reference voltage to one of the inputs of the first comparator in dependence upon the selected operating condition of the monitored subscriber line interface circuit.

In addition, individual ones of a plurality of filter capacitors are connected across the inputs of the first comparator for every selection position of the two selector units. Finally, a gate is coupled to the outputs of the first and second comparators for passing the second output signal in dependence upon the state of the first output signal and the selected operating condition of the monitored subscriber line interface circuit.

The two selector units, which make the successive connections to the first and second sampling points can be realized by a standard electronic switching device in the form of a multiplexor. The number of subscriber line interface circuits combined in a single sub-component of an exchange will therefore correspond to the number of inputs on such a switching device. In this way, the potentials at the two sampling points may be correctly supplied via a corresponding one of these switching devices to the evaluating first comparator for indicating the presence of the first group of operating conditions. As noted above, the reference voltage source provides a different threshold value for this comparator in dependence upon which operating condition is selected in the monitored subscriber line interface circuit by the central control unit. This arrangement makes it possible, in a simple manner, to increase the reliability of the determination of the connection condition. For example, the threshold value applied to the comparator will be raised during the effective high resistance DC voltage supply condition, as compared to the threshold value for the low resistance supply condition, so that the comparator will not be actuated as a result of faulty line insulation.

The second comparator which evaluates the second group of operating conditions is connected unsymmetrically, via one of the selector units, to the second sampling point. Interfering voltages induced in the two subscriber line wires may appear at the two sampling points but will cancel each other out in a symmetrical coupling arrangement, provided that the comparator evaluates the difference in voltages at the two sampling points. By switching in a filter capacitor such interfering voltage components will not have an effect even with the unsymmetrical coupling arrangement. Since a filter is provided also on the comparator arranged to evaluate the first group of operating conditions, the arrangement which contains the DC voltage supply resistors can also lack symmetry without causing an error in the indication associated with the high resistance voltage supply condition.

In the group-wise combination in the circuit arrangement according to the invention using the two selector units only one threshold level is activated for each indication function within the particular group. This arrangement is advantageous because it reduces the expense per subscriber line for the individual circuit components and for balancing the voltage divider resistors which are used to adjust the threshold value.

As compared to one possible solution, in which each sampling point is individually connected via a comparator (to which is applied a corresponding reference voltage) to a series of evaluating gates which combine the individual indicated functions, the solution according to the invention which has only two comparators exhibits a very small power loss while simultaneously increasing reliability. The potentials appearing at the sampling points for determining the individual connection conditions of the subscriber line interface circuits are directly evaluated, resulting in an layout reduction as compared to solutions in which these potentials are temporarily stored in additional storage elements for subsequent evaluation. The circuit arrangement according to the invention also saves space since it makes possible the substantial implementation with integrated circuits.

According to a particular feature of the invention the two inputs of the first comparator, associated with the first mentioned group of operating conditions (in particular, the closed loop indication in both high resistance and low resistance voltage supply condition as well as the calling condition) are each coupled to one of the sampling points whereas only one input of the other comparator associated with the other group of operating conditions (for example, the indication of ground key actuation) is coupled with one of the sampling points. The other input of this second comparator is supplied with a DC reference voltage.

For the first group of operating conditions, the evaluation by the comparator is symmetrical; for the second group the evaluation is unsymmetrical. Interfering voltages which appear identically in the two subscriber line wires by induction will be compensated in the first case by the use of a comparator which evaluates the difference of its two input signals. In the second case, as has been mentioned above, this compensation may be achieved by suitable filtering.

According to a particular feature of the present invention, the first sampling point is disposed on one of the two subscriber line wires on the side of the respective supply resistor or resistors which is (are) opposite to the side connected to the DC voltage source. The second sampling point is disposed on a center connecting tap between two series-connected resistors of equal resistance which form a high resistance bridge connected across the two subscriber line wires on the sides of the respective supply resistors which are opposite to the sides thereof connected to the DC voltage source.

In another preferred feature of the present invention, the resistance of the above mentioned, series-connected resistors is selected such that a potential shift at the first sampling point is produced which is just as great with an open loop connection condition in the high resistance supply operating condition as with the closed loop connection condition in the low resistance supply operating condition. The resistance is also dimensioned, however, such that a distinctly greater potential shift is produced at the first sampling point with a closed loop connection condition in the high resistance supply operating condition. If the resistance is dimensioned in this way, it is a simple matter to test for proper functioning of the open loop/closed loop indication in the circuit arrangement of the present invention.

For a full understanding of the present invention, reference should now be made to the following detailed description of the preferred embodiment and to the accompanying drawing.

DESCRIPTION OF THE PREFERRED EMBODIMENT

A preferred embodiment of the invention which will now be described with reference to the single drawing represents a subscriber line loop of a telephone exchange system in which operating conditions are to be monitored and evaluated. The drawing illustrates all the devices and circuits of the exchange necessary for a better understanding of the invention and cooperating for performing evaluation of operating conditions of a subscriber line.

Telephone exchange systems comprising an electronic switching network K have a multiplicity of subscriber line interface circuits TS individually associated with a subscriber station Tln. These circuits receive and transmit the voice or data signals and supply a DC voltage to the corresponding subscriber station. The voltage supply circuit for a low-resistance supply comprises two supply resistors R1, R2. The first supply resistor R1 is arranged in the B-wire b of the extension line, which wire is connected to ground; the second supply resistor R2 forms part of the A-wire a connected to the negative pole of the supply battery −UB. Both resistors are cross-connected at connector taps at the opposite side of the supply voltage by a capacitor CO. In the circuit of both wires further supply resistors R3 and R4, respectively, can be inserted. Both resistors R3 and R4 can be short-circuited separately by relay contacts 1p and 2p, respectively, arranged in parallel with the associated resistor. It is the purpose of the inserted resistors R3 and R4 to offer a high-resistance voltage supply. The high-resistance supply condition may be chosen for a free-circuit condition. At a time when low-resistance supply is necessary resistors R3 and R4 will be short-circuited by closing relay contacts 1p and 2p. This can be performed when a closed-loop condition is recognized after hook-off of the handset of the subscriber station. Assuming a low-resistance supply during a busy condition of the subscriber station, the supply circuit can nevertheless be switched into its high-resistance condition. This can apply for a critical condition occurring upon excessive load of the supply circuit which can be recognized by a monitoring circuit. In this case, the supply current can be reduced sufficiently to avoid excessive load.

The B-wire b and A-wire a of the extension line connected to the subscriber station Tln are coupled via respective primary windings W1 and W2 of a hybrid circuit U to an exchange supply. Secondary windings which form the four-wire part of the hybrid circuit, providing decoupling of the direct current paths of a calling subscriber from the called subscriber, are not shown since these arrangements are well known and form no part of the present invention.

The electronic switching network K is controlled by a central control unit ZST and switched in such a manner that a subscriber station is connected to further central devices which control, for example, the call set-up for an out-going connection and which may comprise registers or connector sets, depending on the type of exchange. This is also true for establishing a through-connection of an incoming call which is performed also by means of the switching network K. In such a case an individual ringing signal is first applied to the subscriber station Tln generated by a central part of the private branch exchange. A centrally located ring generator RG, generating an AC voltage of ringing frequency, is coupled by a ring signal transformer UR to the subscriber line. The secondary winding of this transformer is connected to the negative pole of the DC supply voltage $-UB$, on the one hand, and via a closed relay contact r and the first supply resistor R1 to the A-wire a of the subscriber line, on the other hand. The ring signal is composed of an AC voltage superimposed on the DC supply voltage $-UB$. At the time of feeding a ring signal onto the subscriber line, relay contacts 1p and 2p should be opened. This means that the signalling current cannot be distorted by the supply current flowing through the supply resistors R1 and R2 and also cannot flow off across capacitor CO, since it is assumed that the further supply resistors R3 and R4 are of high resistance.

Relay contact r and relay contact 1p and 2p are controlled by a conventional relay control which parameters are also performed by an interface unit S which, in turn, is supplied by control signals generated by the central control unit ZST. This interface unit is associated with an entire group of subscriber line interface circuits TS for controlling the transfer of information to and from this group.

In an open-loop condition of the subscriber line loop composed of a subscriber station, a subscriber line interface circuit and the subscriber line connecting these two devices, the established potentials are determined by the value of the exchange battery and by the leakage resistance of the line. Even if this resistance is high, a residual leakage current flows through the line in this switch-off condition. Nevertheless, the potential on the A-wire a should be almost equal to the negative supply voltage $-UB$ and the potential on the B-wire b should be almost zero. In the closed-loop condition of the subscriber line the voltage difference between the two wires a and b drops to a small potential difference which is dependent upon the value of the loop resistance. In general, the potential of both wires should be approximately one half of the supply voltage $-UB$.

For monitoring purposes and for initiating specific control measures it is necessary to recognize the operating condition of a subscriber line. Since different potentials on both wires a and b of the subscriber line can be associated with each of the operating conditions to be distinguished, monitoring of operating conditions can be performed by measuring those potentials. Thus, in use of an evaluating unit, the off-hook condition of a handset of a subscriber line, i.e. the closed-loop condition, the actuation of the ground key at the subscriber station as well the closed loop condition during the ringing condition can be recognized. Also, dialing signals generated by the subscriber can be evaluated. The evaluation of the different operating conditions should be independent from interfering influences. Measures have to be taken to prevent noise and other interfering signals such as AC voltage components induced into the subscriber line from affecting the results.

Potentials for evaluating the operating conditions of the subscriber line can be obtained from a connector tap of two resistors R5 and R6 forming a high-resistance cross-section between both wires a and b and from a connector tap connected to the supply resistors R1 and R3 on the side opposite the positive pole of the supply voltage, i.e. the ground potential of the supply voltage source. Values of the resistors R5 and R6 can be chosen sufficiently high so that a distorting influence on the entire circuit arrangement is avoided. At this connector tap a DC voltage is established which corresponds to approximately one-half of the potential of the supply voltage $-UB$. In case that an adjacent power main induces interfering voltages on the subscriber line, such interfering voltage components are identical in absolute value, phase and frequency on each wire a and b and are eliminated because of the symmetrically arranged connecting point for collecting the potential to be measured.

Sampling of the potentials is performed consecutively for a group of subscriber lines. This is achieved by selector units M1 and M2 having a plurality of signal inputs E1 through En whereby each of the signal inputs of both selector units is associated with a subscriber line. The signal inputs, however, are not directly connected to the connecting points, described above, but to a connector tap of a respective voltage divider which is inserted between the connecting points described and ground. The voltage dividers are composed of resistors R7 and R8, and R9 and R10, respectively. The only purpose of these voltage dividers is to reduce the actual potentials at the connecting points to a level which is acceptable for commercially available integrated circuits. The first selector unit M1 thus is connected by each of its signal inputs E1 through En to respective ones of the connector taps designated as sampling points Sb, and the second selector unit M2 is connected by each of its signal inputs E1 through En to respective ones of further sampling points Sm, which are the connector taps of the other voltage dividers.

Thus, selector units M1 and M2 can comprise commercially available integrated circuits, such multiplexors having 16 signal inputs for monitoring a group of 16 subscriber line interface circuits TS. Accordingly, each selector unit samples consecutively the associated subscriber line interface circuits by through-connecting the respective signal input to an output. At each output of both selector units M1 and M2 there is arranged a further voltage divider. The voltage divider associated with the first selector unit M1 is formed by resistors R12 and R13 and the voltage divider associated with the second selector unit M2 comprises resistors R14 and R15. Across these voltage dividers the outputs of both selector units M1 and M2 are connected to inputs of a comparator K1, i.e. a differential amplifier which may be designed as an operational amplifier. The potential at sampling point Sm is supplied via the second connector unit M2 to a second comparator K2 of the same design having a second input connected via an input resistor R31 to a connector tap of a further voltage divider comprising resistors R29 and R30 for supplying a reference voltage.

At the output side of each differential amplifier K1 and K2 there is arranged a shift register SR1 and SR2, respectively. The output signals of the differential amplifiers K1 and K2 are shifted through these registers and, with a delay determined by the storage time of these registers, delivered to the central control unit ZST via the interface unit S. The transfer of an output signal of the second shift register SR2 is performed under control of an AND-gate G having two control inputs. One of these inputs is connected to the output of the first shift register and the other control input is connected to the central control unit ZST via the interface unit S carrying an enabling signal of logic level "1" at a time when the supply circuit of the sampled subscriber line interface circuit is switched to the low-resistance condition. This condition is obtained, as has been mentioned, as soon as relay contacts 1p and 2p are closed. Output signals of each shift register SR1 and SR2 additionally are supplied to a further voltage divider arrangement which controls, by superimposing a voltage component on the respective reference voltage, the operation of the respective comparator, as will be described in detail later.

The sampling points Sb and Sm of a group of subscriber line interface circuits TS are thus temporarily coupled to the inputs of comparators K1 and K2 under control of selector units M1 or M2. Consecutive sampling of the group of subscriber line interface circuits associated with the selector unit is performed under control of address information which is commonly supplied to selector units M1 and M2 via address inputs A1 and A2 which are commonly connected to an output of the interface unit S. This unit is controlled by the central control unit ZST for generating such address information. The selecting scheme can be designed such that the associated subscriber line interface circuits are sampled in any given order or consecutively whereby the address information just has to be incremented by one for each sampling operation.

As soon as the n-th subscriber line interface circuit TS has been monitored by selecting the corresponding signal input En of the selector units M1 and M2, the monitoring cycle within the exchange system may be continued for parallel groups of subscriber line interface circuits whereby each of these groups also is associated with a respective pair of selector units. Such further groups of subscriber line interface circuits have not been shown for the reasons of clarity since their design and operation is entirely represented by the shown configuration. As soon as monitoring of such further groups of subscriber line interface circuits has been performed, an entire monitoring cycle is completed.

It should be mentioned that the order of sampling the different groups of subscriber line interface circuits also is controlled by the central control unit ZST. The time of an entire monitoring cycle is chosen such that even the fastest change in an operating condition of a subscriber line can be definitely recognized.

Distinguishing between a rest condition and a busy condition of a subscriber line, which is determined by the output signal of the comparator K1, may become somewhat difficult due to leakage losses that occur during the rest condition of the subscriber line. The evaluating unit including the comparator K1 therefore has to be designed such that even the superposition of an interference signal on the leakage current in the rest condition is not interpreted as a busy condition of the line. Conversely, measures have to be taken so that, in case of a busy condition, even a given minimal current reduced by a superimposed interference current is not interpreted as a rest condition of the line. Different lengths of cables and different leakage resistances determine a given set of tolerances within the telephone exchange, by which tolerances a certain range of potentials is predetermined for the busy condition of an average subscriber line. By this range a threshold level for the evaluating unit is determined which separates the ranges of potentials associated with the rest condition, on the one hand, and the busy condition, on the other hand. Thus, in determining the value of this threshold value it has to be considered that the maximum tolerable leakage resistance cannot cause a condition which is interpreted as the busy condition of a subscriber line. Independent from the operating condition of the subscriber line predetermined by the circuit design, different thresholds are also inherent for adequate operation of evaluating units employed for effectively monitoring these operating conditions. Such threshold values of the first comparator K1 are associated with three possible operating conditions: the low-resistance condition and the high-resistance condition of the supply circuit and the calling condition. In the calling condition ringing AC voltage is applied, as described, by closing relay contact r in a subscriber line interface circuit. The respective threshold values for comparator K1 are established by voltage dividers composed of resistors R17, R18, resistors R19, R20 and resistors R21, R22, respectively. The first and the second of the mentioned voltage dividers are inserted between the negative pole −UB of the supply voltage and ground, whereas the last voltage divider receives a negative reference voltage Rf comprising the ringing voltage superimposed on the supply voltage. The superimposed voltage is obtained at the secondary winding of the ring signal transformer UR on the side closest to the connector tap for feeding the supply voltage and is passed in parallel to all subscriber line interface circuits.

The potentials established at connector taps of each of these voltage dividers are superimposed on the voltage which is supplied to the first comparator K1 via resistor R13. As described, this voltage, the original input voltage, is sampled from a sampling point Sb of the currently through-connected subscriber line interface circuit TS across the first selector unit M1.

At the second inputs of comparators K1 and K2 there is supplied correspondingly the adjusted potential which is sampled by the second selector unit M2 from sampling point Sm. This potential is reduced to a value which is acceptable for electronic devices designed in integrated circuit technology by resistors R14 and R15 which form a voltage divider.

By selectively superposing of voltages established by resistances R17 through R22 on the potential which is sampled from sampling point Sb different threshold levels are determined. The following equations may be used, for example, for dimensioning the voltage dividers: R8=R10; R7=(R5//R6)+R9; R12=R14; R15=R23+(R21//R22)=R24+(R19//R20)=R25+(R17//R18), where the symbol "//" means the resistance resulting from the parallel connection of the designated resistors (e.g. R5 and R6). A further selector M4 determines by its state which of the thus established threshold levels is to be activated. This selector unit, which also could be designed as controlled electronic switches, is controlled in dependence upon the current operating condition of the presently selected subscriber line interface circuit, which operating condition is stored in the central control unit ZST. The state of the selector unit M4 is determined by address signals generated by the interface unit S in the same manner as for the other selector units of the circuit arrangement. There is thus established a potential at the non-inverting input of comparator K1 which corresponds to a reduced voltage taken from the connecting tap of both resistors R5 and R6 forming the cross-connection between the B-wire b and the A-wire a. The value of this voltage is proportional to one half of the supply voltage −UB. The voltage to be measured at the connecting point Sb gives information about the condition of the subscriber line since different potentials are established in an open-loop condition and a closed-loop condition. Additionally, these potentials are dependent upon the voltage supply condition of the supply circuit, i.e., either a high-resistance condition or a low-resistance condition. In the first case, as described, relay contacts 1p and 2p are open. The potential on the B-wire b and thus at sampling point Sb becomes negative because of the low direct current resistance of the subscriber station in an off-hook condition of the handset. Thus, the given threshold value, which can correspond to a phantom resistance of about 10K ohm between both wires of the subscriber line, is reached.

Like this one threshold value, other values are provided for the other various operating conditions. The threshold value is higher for the high-resistance supply condition than for the low-resistance supply condition, thus avoiding that, because of insufficient insulation and corresponding leakage loss, the evaluating unit indicates a closed-loop condition by mistake. The resistances of the voltage dividers supplying the superimposed voltages are chosen such that the voltage difference at the inputs of the first comparator K1 is zero as soon as a threshold value is reached (this threshold value corresponding to the determined value of the phantom resistance between the wires of the subscriber line). This value is reached during a transition from the open-loop condition to the closed-loop condition and vice versa. The value of the phantom resistance, which corresponds to a zero voltage difference between the inputs of the comparator K1 is independent of any changes of the supply voltage −UB and the ring voltage. This is achieved by supplying the voltage divider, which determines the presently selected threshold value under control of selector unit M4, by the supply voltage −UB and by the reference voltage Rf comprising the ring voltage superimposed on the supply voltage, as described. Thus, the voltages passed to the input circuits of the comparator K1 are dimensioned in such a manner that their difference becomes zero whenever a subscriber line resistance occurs which corresponds to the given threshold value. This results in a change of the output signal of comparator K1. It is assumed that this output signal has a logic level "0" corresponding to an open-loop condition, and a logic level "1" in case of a closed-loop condition. The same output signal will be generated for each sampling of one and the same subscriber line interface circuit as long as the operating condition is maintained.

The dimensioning of the threshold value corresponding to a calling condition will now be described in detail. In the calling condition the amplitude of the AC voltage at the sampling point Sb is less than the voltage at the sampling point Sm. The potentials at both sampling points are supplied to both inputs of the comparator K1 via the corresponding voltage dividers, as described. The difference of these input voltages becomes zero, by definition, as soon as threshold value is reached in which case the difference resulting from the AC component is balanced. This is achieved by an adjusted ring voltage component which is supplied via the resistor R23 and the through-connected selector unit M4 superimposed on the potential received from the sampling point Sb. In this way, the superimposed AC voltage component occurring during the calling condition can be eliminated with respect to the DC control of comparator K1.

The described threshold values for the different operating conditions of a subscriber line are not fixed values but are dynamically adjustable in each case. Because of this dynamic adjustment any interfering parameters of values which can be still tolerated and which cause insignificant changes of the phantom resistance of the subscriber line cannot invalidate the measuring result. This is achieved by superimposing the output information of the comparator K1, which is temporarily buffered by the shift register SR1, on the steady reference voltage supplied by the respective voltage divider. A leakage current resulting from the leakage loss of a presently monitored subscriber line and which corresponds to the phantom resistance thus cannot cause constantly changing operating conditions of the comparator K1; i.e., an oscillating output signal.

The shift register SR1 is triggered under control of signals delivered by the central control unit ZST after each sampling interval of a subscriber line interface circuit TS within a group of n subscriber lines. The output signal of the register SR1, referring to the operating condition of a subscriber line interface circuit, is thus buffered (delayed) by one cycle time which is determined by a time span necessary for sampling n subscriber lines associated with the selector units. This output signal of the shift register SR1 is transferred via the AND gate G to the interface unit S which, in turn, transfers this information as well as other information to the central control unit ZST in the properly coded form.

The current output signal of the shift register SR1 is additionally passed via an inverting buffer amplifier T1 and via three further resistors R26 through R28, connected in parallel to the output of this amplifier T1, to an adjustable tap of three variable resistors R18, R20 and R22, respectively. These variable resistors can, in practice, be designed as two separate resistor elements by a respective connector tap which corresponds to the adjustable tap shown in the FIGURE.

The voltage divider comprising resistors R19 and R20 determines, in the corresponding operating condition of selector unit M4, one of the threshold values for the switch-on condition of comparator K1. If the output signal of the comparator K1 corresponds to the logic level "1" during the previous monitoring cycle when sampling the same subscriber line, a positive potential is produced at the output of the buffer amplifier T1. Thus, the input signal supplied to selector unit M4, by means of the resistor R24, which is connected to the connector tap of resistors R19 and R20 is shifted in positive direction. This shift accordingly also applies to the condition at the inverting input of the comparator K1. Since this component is superimposed on the voltage which is obtained from the sampling point Sb, the reference voltage is adjusted in a direction which eliminates a premature indication. Accordingly, a hysteresis is imposed on the effective threshold value by this dynamically adjusted threshold and therefore the presently sampled potential can be definitively evaluated. Only if the line resistance is again so high that the voltage difference at the comparator inputs overcomes this dynamic voltage component—that is, the difference between the upper and lower threshold values—then the comparator is K1 switched into the opposite operating state; i.e., the operating state for generating an output signal of logic level "1" which determines the rest condition. A shift register used for controlling dynamically adjusting the threshold value is additionally necessary for synchronizing signal transfer within the exchange control. The synchronization is achieved, by the way of example, such that only information which is generated by electrical components of the circuit arrangement in steady condition is validated.

It has been indicated that the comparator K1 generates output signals indicating a closed-loop condition as well as a calling condition occurring in combination with the closed-loop condition. This calling condition then results in a calling release. For recognizing as actuated ground key there is provided the second comparator K2 and the second shift register SR2 connected to its output, also having a feedback circuit for establishing a dynamic threshold value and also coupled to the output of the selector unit M2 which collects the potentials at sampling points Sm of the various subscriber line interface circuits.

By actuating the ground key ET both wires of the subscriber line are grounded at the subscriber station Tln. The dynamically adjusted threshold value of the second comparator K2 is established by characteristics of the second shift register SR2, a second buffer amplifier T2 and a resistor network comprising resistors R29, R30 and R31. Resistors R29 and R30 again comprise a voltage divider arranged between the negative pole of the supply voltage —UB and ground. The non-inverting input of comparator K2 is coupled to a central connector tap of this voltage divider across the third resistor R31 of this resistor network. To establish dynamical hysteresis, again at a time synchronized with the monitoring interval, the output signal of comparator K2 is fed back via the non-inverting buffer amplifier T2 to the adjustable tap of the resistor R30 of the voltage divider. The characteristic of this feedback network is the same as that of the feedback network associated with the comparator K1. Accordingly, in a like manner the shift register SR2 is controlled by the central control unit ZST in synchronism with the monitoring cycle.

The voltage divider comprising resistors R29 and R30 is designed such that the negative potential occurring at the central connector tap connected to both resistors has a somewhat smaller value than the corresponding collected negative potential at each sampling point Sm in case of a closed-loop condition. As soon as the ground key ET is actuated, the potential on the A-wire a changes from a minus potential to a plus potential so that the potential at the sampling point Sm also becomes positive. This voltage difference causes the second comparator K2 to switch its operating state since its present threshold value is exceeded. Thus actuation of the ground key ET is designated by the occurrance of the logic level "1". When one and the same subscriber line interface circuit TS—i.e., the same sampling point Sm—is monitored again after one cycle (of about 4 ms), this output signal has been shifted through the second shift register SR2 and is transmitted to the interface unit S of the central control unit ZST if the AND-gate G is enabled. The condition for enabling the AND-gate G is present if, in addition to an output signal from the second shift register SR2, the second input of this gate is provided with a control signal indicating a low-resistance supply condition of the corresponding subscriber line and if the third input receives an output signal of the first shift register SR1 which corresponds to a closed loop condition of the corresponding subscriber line. In such a case, where the AND gate G produces a logic level "1" output, the central control unit initiates control routines which are associated with the sensed opertating condition of the subscriber line. Such control routines may include a call back procedure and, upon recognition of the calling subscriber as a privileged subscriber, initiating the necessary procedures. Such procedures and control routines are not part of the present invention; therefore, detailed description thereof is not believed to be necessary.

Measures need to be taken so that AC voltage components comprising induced interfering voltages or superimposed useful signals, such as a superimposed ringing voltage, do not invalidate the result. An especially critical situation is the calling condition and the high-ohmic supply condition of a subscriber line. For monitoring these operating conditions the corresponding potentials are symmetrically collected at the sampling points Sb and Sm and applied to the inputs of the comparator K1. Since, assuming the supply circuit is properly balanced to ground, induced voltages will occur on both wires symmetrically, their influence is eliminated at the inputs of comparator K1 which is designed as a differential amplifier. Such a proper balance can be taken for granted in a low-ohmic supply condition so that further measures for filtering are not necessary. The evaluating unit can be designed such that, in such a case, the common mode condition of the differential amplifier is still maintained even with maximally induced interfering signals. In the case where the supply circuit is in the high-resistance condition—i.e., the resistors R3 and R4 are inserted into the B-wire and the A-wire, respectively, such an assumption cannot be assured. In this case, and in case of the calling condition, a plurality of filter sections having a low pass characteristic are successively connected in parallel to both inputs of the first comparator K1. In a preferred implementation, each filter section individually associated with each of the sampling channels comprises one of n filter capacitors Cl through Cn in combination with the resistors R13 and R16. For individually selecting one of the capacitors Cl through Cn, there is arranged a further selector unit M3 which is controlled, identically to selector units M1 and M2, by control information applied to address inputs A3. Thus the selector unit M3, operating synchronously with the selector units M1 and M2, selects one of the filter capacitors C1 through Cn arranged at its outputs for filtering the currently selected sampling signal. This means that each filter section is effective only during the corresponding monitoring interval and is not reactivated again until an entire monitoring cycle has been completed. Assuming that the frequency of the AC voltage component to be filtered is smaller than the monitoring frequency determined by the period of a monitoring cycle, the filter arrangement implemented in the described manner overcomes certain limitations of integrated circuit technology. In comparison to a fixedly connected filter capacitor, a periodically selected filter capacitor offers the opportunity of different dimensioning. The capacitance of each filter capacitor according to the present invention can be 1/n-th of the capacitance of a permanently connected capacitor since the long period during which the filter capacitor is not activated means a long discharge time. This time determines a "virtual" the constant which is n times greater than the time constant of a fixedly connected capacitor of the same capacitance. In this way, a sufficient filter characteristic can be achieved by a filter capacitor of small dimensions. The necessary capacitance for the filter capacitor may be further reduced if the time span for activating a filter section is just a fractional part of a monitoring interval. This offers the possibility for a circuit design in which the filter capacitors are directly integrated into an integrated circuit.

The filter effect which is achieved by means of the resistors R13 and R16 and one of the filter capacitors C1 through Cn can easily be dimensioned so that, even in case of a closed relay contact 1p and thereby a short-circuited resistor R3, i.e. in case of an unsymmetrical high-resistance supply condition, induced direct access voltage components can be eliminated to such an extent that an invalidation of the output signal of the first comparator K1 is definitely avoided.

Filter capacitors C1 through Cn selected by the third selector unit M3 are used additionally for filtering the input signals which are applied to the second comparator K2. This comparator serves, as described, as an evaluating unit for recognizing an actuated ground key. The collection of the potentials at the sampling points, in this case, is performed unsymmetrically. Therefore, interfering voltage components superimposed on the useful signals have to be taken into consideration. The individual filter capacitors activated by the third selector unit M3 are effective with respect to the inputs of the comparator K1 only in the calling condition and the high resistance supply condition of the subscriber line. In the low-resistance supply condition, the filter capacitor corresponding to the presently selected subscriber line is directly connected, under control of a toggle switch SC, to an input of the second comparator K2. The toggle switch Sc is, in turn, controlled by the central control unit ZST in combination with the interface unit S. For actuating a filter capacitor no additional control logic is necessary since the corresponding control signals can be derived in accordance with the addressing scheme of the selector units.

The condition of the supply circuit is temporarily stored in the central control unit ZST since the operation of the relay P also has to be controlled by such units. Thus, without additional outlay, the filter capacitors C1 through Cn can be used for three different indications. There is thus achieved, in the circuit arrangement described, a very low sensitivity to the supply of the ringing voltage as well as to interfering voltages in the high-resistance condition of the supply circuit, which can be unsymmetrical due to short-circuiting of the resistor R3.

There has thus been shown and described a novel circuit arrangement which fulfills all the objects and advantages sought therefore. Many changes, modifications, variations and other uses and applications of the subject invention will, however, become apparent to those skilled in the art after considering this specification and the accompanying drawing which disclose preferred embodiments thereof. All such changes, modifications, variations and other uses and applications which do not depart from the spirit and scope of the invention are deemed to be covered by the invention which is limited only by the claims which follow.

What is claimed is:

1. A circuit arrangement for determining the connections conditions of a plurality of subscriber lines in a telecommunications network, each of said subscriber lines having two wires extending between a subscriber station and a subscriber line interface circuit, said two wires being connected in said subscriber line interface circuit via respective resistors to the two poles of a DC voltage source, said circuit arrangement comprising in combination:

(a) first comparator means (K1) having first and second inputs and an output, said first comparator means producing a first output signal at its output indicating the presence of a first group of operating conditions;

(b) second comparator means (K2) having first and second inputs and an output, said second comparator means producing a second output signal at its output indicating the presence of a second group of operating conditions;

(c) a first sampling point (Sb) in each subscriber line interface circuit presenting a first voltage condition thereof;

(d) a second sampling point (Sm) in each subscriber line interface circuit presenting a second voltage condition thereof;

(e) first selector means (M1) having parallel signal inputs, an output and a control input for receiving an address control signal for selectively connecting each one of said signal inputs to said output during a monitoring cycle, each of said signal inputs of said first selector means being coupled to a first sampling point of one of said subscriber line interface circuits;

(f) second selector means (M2) having parallel signal inputs, an output and a control input for receiving an address control signal for selectively connecting each one of said signal inputs to said signal output during a monitoring cycle, each of said signal inputs being coupled to a second sampling point of one of said subscriber line interface circuits, at least one input of each of said first and second comparator means being coupled to said first and said second sampling points via said first and second selector means and a respective voltage divider;

(g) central control means (ZST and S) for selecting certain operating conditions of each subscriber line interface circuit;

(h) first reference voltage source means, responsive to said central control means, for producing a first reference voltage in accordance with the selected operating condition of the monitored subscriber line interface circuit, said first reference voltage being coupled to one of said inputs of said first comparator means;
(i) a plurality of filter capacitors (Cl to Cn);
(j) means coupling a separate one of said capacitors across said inputs of said first comparator means for every selection position of said first and second selector means; and
(k) signal enabling means, coupled to the outputs of said first and second comparator means, for passing said second output signal in dependence upon the state of said first output signal and the selected operating condition of the monitored subscriber line interface circuit.

2. The circuit arrangement recited in claim 1, wherein said subscriber stations are telephones and said subscriber line interface circuits are associated with a private branch exchange.

3. The circuit arrangement recited in claim 1, wherein said two inputs of said first comparator are coupled to said first and second sampling points via said first and second selector means and respective voltage dividers.

4. The circuit arrangement recited in claim 1, wherein one input of said second comparator is coupled to said second sampling point via said second selector means and a voltage divider and the other input of said second comparator is coupled to a second reference voltage source means for producing a second reference voltage.

5. The circuit arrangement recited in claim 1, wherein said signal enabling means is operative to pass said second output signal only if said first output signal is present and the monitored subscriber line interface circuit is in the low-resistance DC voltage supply operating condition.

6. The circuit arrangement recited in claim 5, wherein the presence of said first output signal indicates the closed loop connection condition of the monitored subscriber line and the presence of said second output signal indicates that actuation of a ground key at the monitored subscriber station.

7. The circuit arrangement recited in claim 1, wherein said first reference voltage source means includes means for dynamically adjusting said first reference voltage in dependence upon said first output signal.

8. The circuit arrangement recited in claim 4, wherein said second reference voltage source means includes means for dynamically adjusting said second reference voltage in dependence upon said second output signal.

9. The circuit arrangement recited in claim 3, wherein said first reference voltage is superimposed on the voltage of one of the inputs of said first comparator received from one of said first and second sampling points.

10. The circuit arrangement recited in claim 1, wherein said respective supply resistors according said two subscriber line wires to the two poles of a DC voltage source in each subscriber line interface circuit each comprise a first resistor of low resistance, a second resistor of higher resistance and means for selectively short circuiting said second resistor, thereby to select either a low resistance or a high resistance DC voltage supply.

11. The circuit arrangement recited in any one of claims 1–10, wherein said first sampling point is disposed on one of said two subscriber line wires on the side of said respective supply resistor which is opposite to the side connected to said DC voltage source and wherein said second sampling point is disposed on a center connecting tap between two resistors of equal resistance, said two resistors forming a high resistance bridge connected across said two subscriber line wires on the sides of said respective supply resistors which are opposite to the sides connected to said DC voltage source.

12. The circuit arrangement recited in claim 11, wherein the resistance of said two resistors is selected such that at said first sampling point a potential shift is produced which is just as great with an open loop condition in the high resistance supply condition as with the closed loop condition in the low resistance supply condition however, the potential shift at said first sampling point is distinctly greater with a closed loop condition in the high resistance supply condition.

* * * * *

UNITED STATES PATENT AND TRADEMARK OFFICE
CERTIFICATE OF CORRECTION

PATENT NO. : 4,320,260

DATED : March 16, 1982

INVENTOR(S) : Robert Lechner

It is certified that error appears in the above—identified patent and that said Letters Patent is hereby corrected as shown below:

In the Description of the Preferred Embodiment, column 13, line 21, please change "the" to --time-- and in the claims, column 16, line 14, please change "according" to --connecting--.

Signed and Sealed this

Twentieth Day of July 1982

[SEAL]

Attest:

Attesting Officer

GERALD J. MOSSINGHOFF

Commissioner of Patents and Trademarks